US008875834B1

(12) United States Patent
Sirbu et al.

(10) Patent No.: US 8,875,834 B1
(45) Date of Patent: Nov. 4, 2014

(54) INCREASED STIFFNESS UNDERBODY PANEL

(71) Applicant: GM Global Technology Operations LLC, Detroit, MI (US)

(72) Inventors: Liviu Octavian Sirbu, Rochester, MI (US); Benjamin W Michajlyszyn, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/861,748

(22) Filed: Apr. 12, 2013

(51) Int. Cl.
*B62D 21/00* (2006.01)
*B62D 21/10* (2006.01)

(52) U.S. Cl.
CPC ..................................... *B62D 21/10* (2013.01)
USPC ............... 180/312; 280/124.109; 296/193.07; 296/204

(58) Field of Classification Search
CPC ........ B62D 21/10; B62D 21/11; B62D 35/02; B60K 5/12; B60K 5/1208; B60G 2204/15; B60G 2206/60; B60G 2206/604; B60G 2206/606
USPC ................. 180/312; 280/124.109; 296/181.5, 296/193.07, 204
See application file for complete search history.

(56) References Cited

U.S. PATENT DOCUMENTS

| | | | | |
|---|---|---|---|---|
| 2,718,288 A | * | 9/1955 | Boyer | 52/481.1 |
| 4,263,980 A | * | 4/1981 | Harlow et al. | 180/292 |
| 4,501,436 A | * | 2/1985 | Ishida | 280/124.108 |
| 4,720,120 A | * | 1/1988 | Shimatani et al. | 280/124.109 |
| 5,074,374 A | * | 12/1991 | Ohtake et al. | 180/312 |
| 5,556,133 A | * | 9/1996 | Oku et al. | 280/781 |
| 5,611,569 A | * | 3/1997 | Sekiguchi et al. | 280/788 |
| 5,879,026 A | * | 3/1999 | Dostert et al. | 280/781 |
| 5,992,926 A | * | 11/1999 | Christofaro et al. | 296/204 |
| 6,109,654 A | * | 8/2000 | Yamamoto et al. | 280/784 |
| 6,390,224 B1 | * | 5/2002 | Yoshida | 180/312 |
| 6,402,172 B1 | * | 6/2002 | Suzuki | 280/124.109 |
| 6,409,216 B2 | * | 6/2002 | Suzuki | 280/781 |
| 6,511,096 B1 | * | 1/2003 | Kunert et al. | 280/785 |
| 6,679,523 B2 | * | 1/2004 | Yamamoto et al. | 280/785 |
| 6,869,090 B2 | * | 3/2005 | Tatsumi et al. | 280/124.109 |
| 6,979,023 B2 | * | 12/2005 | Mikasa et al. | 280/781 |
| 7,252,326 B2 | * | 8/2007 | Wada | 296/204 |
| 7,461,850 B2 | * | 12/2008 | Kurth | 280/124.109 |
| 7,520,514 B2 | * | 4/2009 | Ogawa et al. | 280/124.109 |
| 7,832,519 B2 | * | 11/2010 | Sakamoto et al. | 180/312 |
| 7,857,349 B2 | * | 12/2010 | Fujiki et al. | 280/785 |
| 7,883,113 B2 | * | 2/2011 | Yatsuda | 280/784 |

(Continued)

FOREIGN PATENT DOCUMENTS

FR 2987093 A1 * 8/2013
JP 06144300 A * 5/1994

*Primary Examiner* — Joseph M Rocca
*Assistant Examiner* — Laura Freedman
(74) *Attorney, Agent, or Firm* — Quinn Law Group, PLLC

(57) ABSTRACT

A vehicle structure includes a frame having a first frame rail and a second frame rail. The first and second frame rails are spaced apart by a distance and are substantially parallel to one another. The vehicle structure also includes a vehicle body attached to the frame. The vehicle structure also includes a cradle mounted under the vehicle body to each of the first and second frame rails and configured to support a vehicle drivetrain subassembly. The vehicle structure additionally includes a panel attached to each of the first and second frame rails and the cradle, and configured to stiffen the vehicle structure.

18 Claims, 4 Drawing Sheets

(56) References Cited

U.S. PATENT DOCUMENTS

| | | | |
|---|---|---|---|
| 8,132,851 B2* | 3/2012 | Steller et al. | 296/187.04 |
| 8,246,061 B2* | 8/2012 | Kang | 280/124.109 |
| 8,408,566 B2* | 4/2013 | Teichmann et al. | 280/124.109 |
| 8,480,102 B2* | 7/2013 | Yamada et al. | 280/124.109 |
| 8,579,310 B2* | 11/2013 | Tanaka et al. | 280/124.135 |
| 2002/0050413 A1* | 5/2002 | Renault | 180/69.1 |
| 2006/0284449 A1* | 12/2006 | Miyahara | 296/204 |
| 2013/0181476 A1* | 7/2013 | Naoi | 296/180.1 |
| 2013/0249250 A1* | 9/2013 | Ohhama et al. | 296/204 |
| 2013/0285416 A1* | 10/2013 | Fukushi et al. | 296/204 |

* cited by examiner

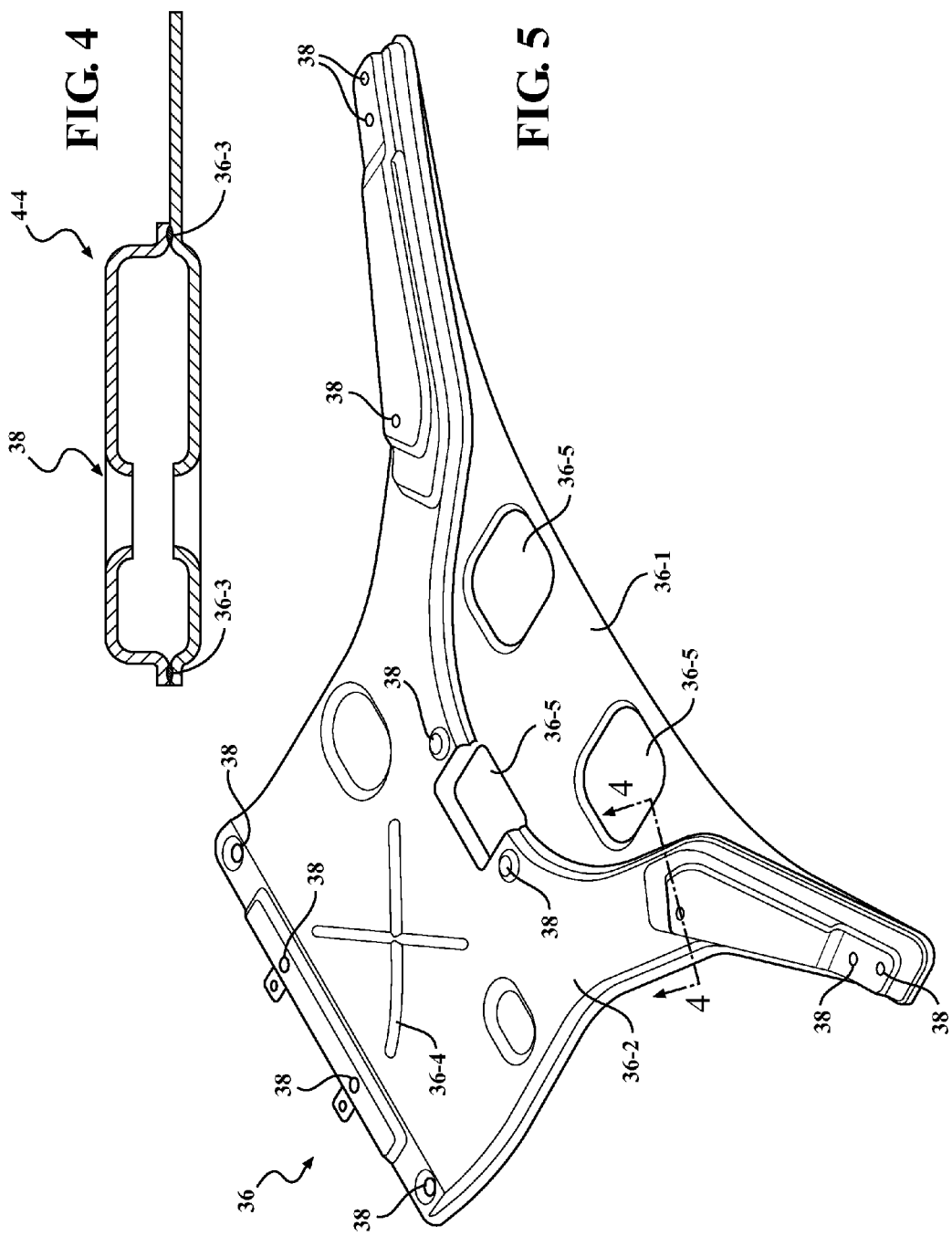

INCREASED STIFFNESS UNDERBODY PANEL

TECHNICAL FIELD

The present disclosure relates to an increased-stiffness underbody panel for a vehicle.

BACKGROUND OF THE INVENTION

Typically, a vehicle includes a structure for enclosing and supporting various vehicle systems, as well as the vehicle passengers. Heavy-duty vehicles, such as pick-up trucks and vans, commonly employ a frame to support a body and a powertrain of the vehicle. On the other hand, light-duty vehicles, such as a majority of passenger cars, often employ a monocoque or unibody construction that eschews a separate body and frame, in favor of a lighter, integrated structure. Additionally, some lighter-duty vehicles employ a combination monocoque structure with a subframe for carrying the vehicle's powertrain. Frequently, additional structural members are used to buttress the vehicle structure, as well as for supporting various chassis and powertrain subsystems.

SUMMARY OF THE INVENTION

A vehicle structure includes a frame having a first frame rail and a second frame rail. The first and second frame rails are spaced apart by a distance and are substantially parallel to one another. The vehicle structure also includes a vehicle body attached to the frame. The vehicle structure also includes a cradle mounted under the vehicle body to each of the first and second frame rails and configured to support a vehicle drivetrain subassembly. The vehicle structure additionally includes a panel attached to each of the first and second frame rails and the cradle, and configured to stiffen the vehicle structure.

The cradle may be defined by a first end and a second end. Also, the cradle may be mounted to the first frame rail proximate the first end and proximate the second end, as well as to the second frame rail proximate the first end and proximate the second end. Additionally, the panel may be attached to the cradle proximate the first end and proximate the second end, and to each of the first and second frame rails.

The panel may include a first portion and a second portion fused together to form a boxed cross-section.

Each of the first portion and the second portion may be formed from aluminum. In such a case, the first and second portions may be fused together via a weld bead.

The cross-section may include a plurality of apertures extending therethrough. Additionally, each of the plurality of apertures may be configured to accept a fastener for attachment of the panel to one of the cradle and the rails.

The cradle may include a first cross-member spanning the distance between the first and second frame rails and a second cross-member spanning the distance between the first and second frame rails. In such a case, the panel may be attached to each of the first and second cross-members.

The cradle may include a first side section and a second side section, and first, second, third, and fourth cast node sections. The first and second cast node sections may attach the first cross-member to the first and second side sections, respectively, and the third and fourth cast node sections may attach the second cross-member to the first and second side sections, respectively. The panel may then be attached to each of the first, second, third, and fourth cast node sections.

The vehicle body may be characterized by a longitudinal centerline. Additionally, the first and second frame rails and the cradle may each be arranged substantially symmetrically with respect to the centerline. Furthermore, the plurality of apertures may be configured as a pattern that is arranged substantially symmetrically with respect to the centerline.

The vehicle drivetrain subassembly may include a powertrain having at least one of an internal combustion engine, a motor-generator, a fuel cell, and a transmission. The vehicle drivetrain subassembly may also include a differential gearset.

The panel may be characterized by a generally continuous surface between the first end and the second end such that aerodynamic disturbance under the vehicle body is minimized.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 4 is a view of a cross-section of the structure-stiffening panel shown in FIG. 2.

FIG. 5 is a top view of the structure-stiffening panel shown in FIG. 2.

DESCRIPTION OF THE PREFERRED EMBODIMENTS

Figure 1:
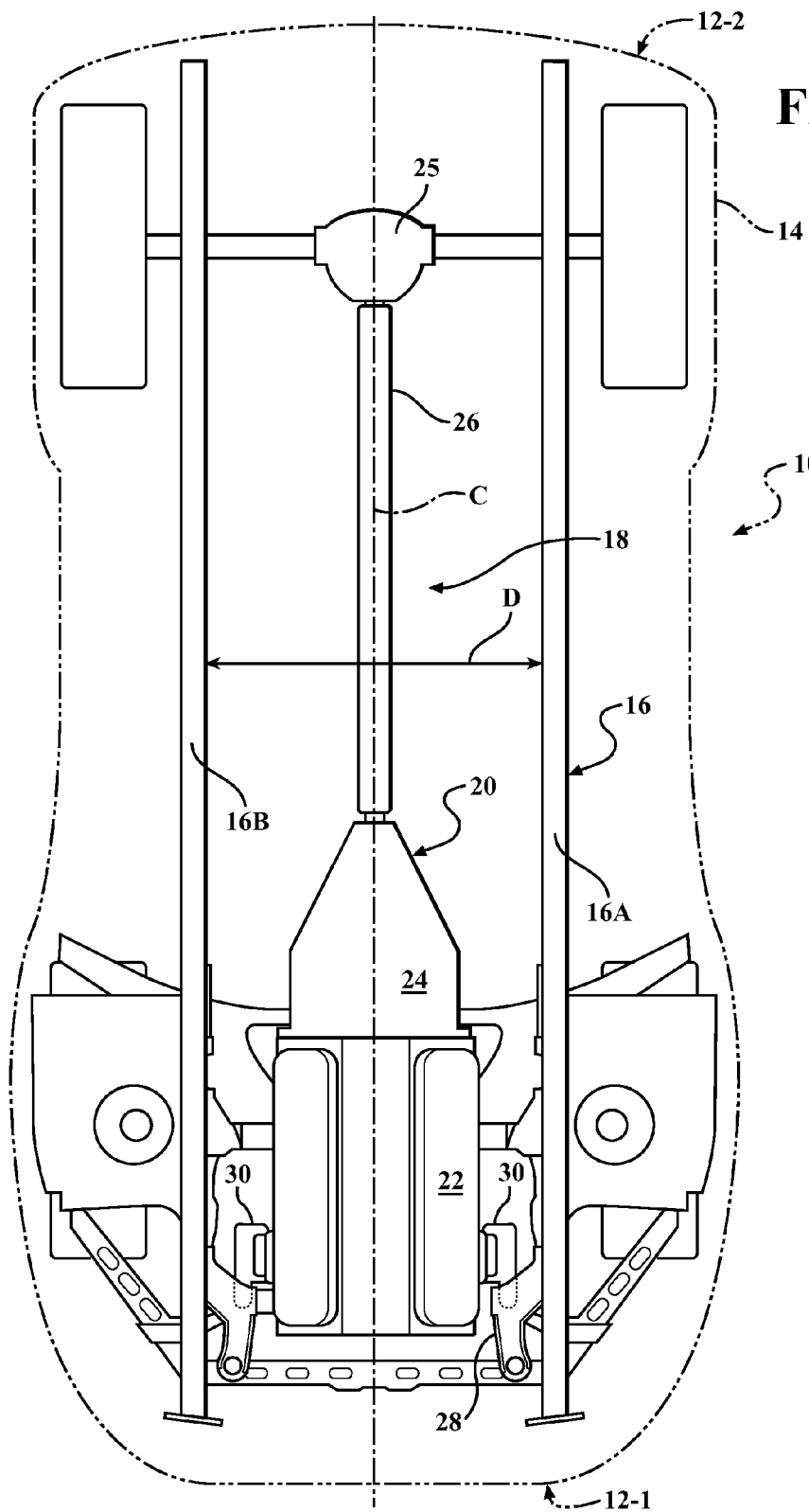
FIG. 1 is a schematic top view of a vehicle structure supporting a vehicle drivetrain.

Referring to the drawings, wherein like reference numbers refer to like components, FIG. 1 shows a perspective schematic view of a vehicle 10 having a vehicle structure 12 having a front portion 12-1 and a rear portion 12-2. The vehicle structure 12 is made up of a vehicle body 14 constructed from a number of components and sub-structures, as understood by those skilled in the art, and a frame 16. The vehicle body 14 is characterized by a longitudinal centerline C. The vehicle body 14 is attached to the frame 16, thus enabling a support structure for a vehicle suspension (not shown) and wheels, while also supporting a vehicle drivetrain subassembly 18, passengers, and cargo.

As shown, the frame 16 includes two frame rails, 16A and 16B, separated in vehicle structure 12 by a distance D. The frame rails 16A and 16B may be substantially parallel with respect to each other, e.g., within +/−5° of true parallel. The first and second frame rails 16A, 16B are arranged substantially symmetrically with respect to the centerline C. As used herein, the term "substantially symmetrically" may denote a positioning of specified components that is within +/−5 cm of true symmetry with respect to the centerline C. Frame rails 16A and 16B are typically made from steel, and are formed by any appropriate method, such as hydro-forming, roll-forming, stamping, and welding. The shown portion of frame 16 may be part of perimeter framed heavier-duty work vehicle, such as a pick-up truck or a van, or a unibody structure, as is typically employed in passenger vehicles. As appreciated by those skilled in the art, the disclosed vehicle structure 12 may be used in a rear-wheel drive, front-wheel drive, or four-wheel drive configuration.

Figure 2:
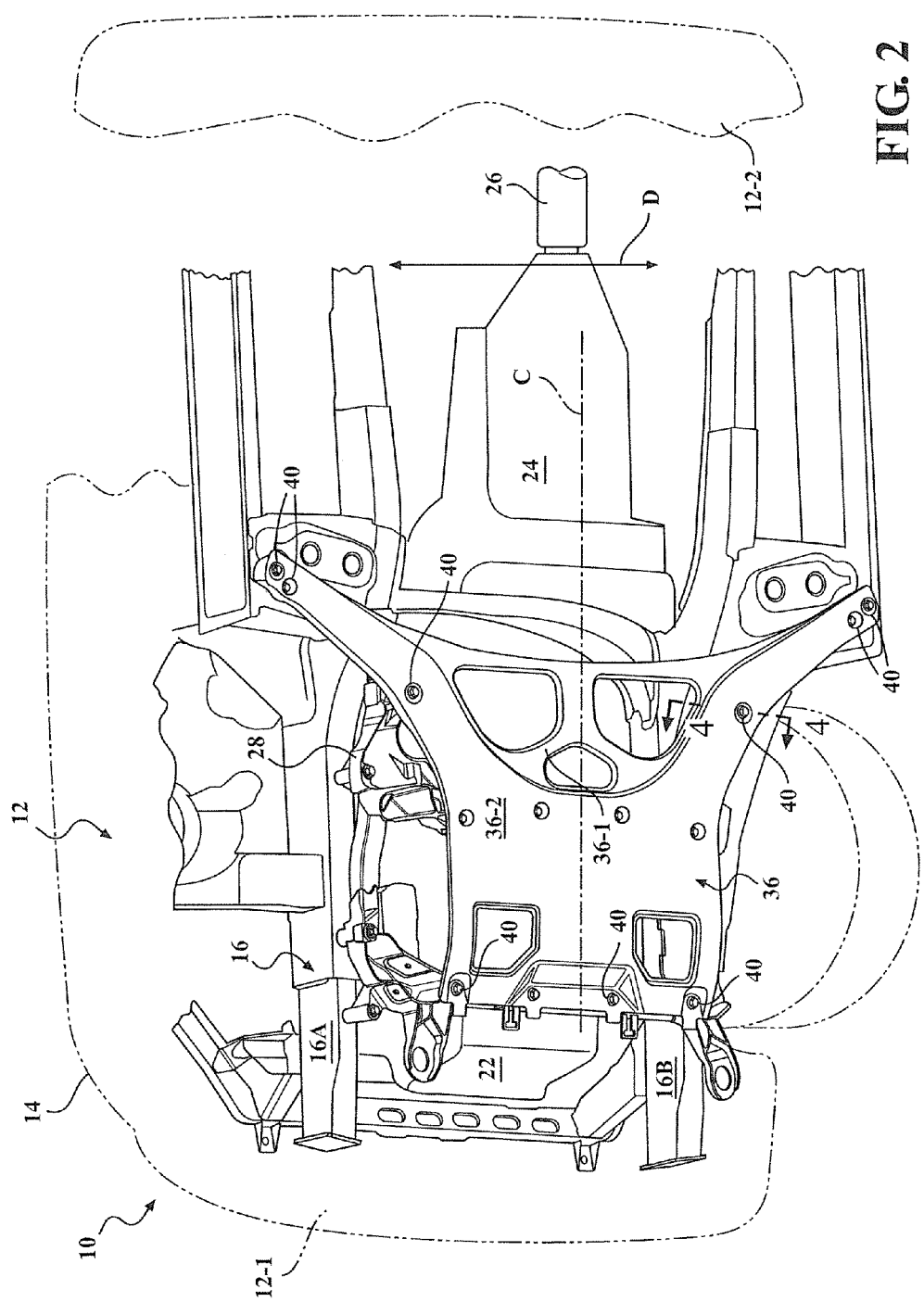
FIG. 2 is a schematic perspective bottom view of the vehicle structure shown in FIG. 1, specifically depicting a frame, a powertrain cradle, and a structure-stiffening panel.

The drivetrain subassembly 18 includes a powertrain 20 having an internal combustion engine 22 coupled to a transmission assembly 24. The powertrain 20 may be positioned proximate the front portion 12-1 (as shown in FIGS. 1-2) of the vehicle structure 12, or proximate the rear portion 12-2. The drivetrain 18 may also include a driveshaft 26 coupled to the transmission assembly 24 and configured to transmit torque of the engine 22 to driven wheels via a differential 25, which may be positioned proximate the rear portion 12-2, as shown in FIG. 1. In addition to engine 22 and the transmission assembly 24, powertrain 18 may also include an electric motor/generator (not shown) for hybrid propulsion of the subject vehicle, or a fuel-cell, as understood by those skilled in the art. Transmission assembly 24 may also include a gear train and torque transmitting members (not shown) operatively connecting the engine 22 and the driveshaft 26, and arranged to enable selection of appropriate gear ratios for most effective propulsion of the vehicle 10.

The vehicle structure 12 also includes a cradle 28 mounted under the body 14 to each of the first and second frame rails 16A, 16B. The cradle 28 is each arranged substantially symmetrically with respect to the centerline C. The powertrain 20 is mounted to the cradle 28 via a pair of engine mounts 30, with one mount positioned on either side of the engine (due to the perspective view shown in FIG. 1, only a single mount is shown). Mounts 30 are specially designed to support the mass of engine 20, as well as to absorb vibration of a running engine, and withstand the torque couple that is generated by the engine during propulsion of the vehicle 10. The mass and vibration of the transmission assembly 24, as well as the torque couple generated by engine 18 during propulsion may be fully supported by the cradle 28 or an additional support via a separate transmission mount (not shown) may be employed.

Figure 3:
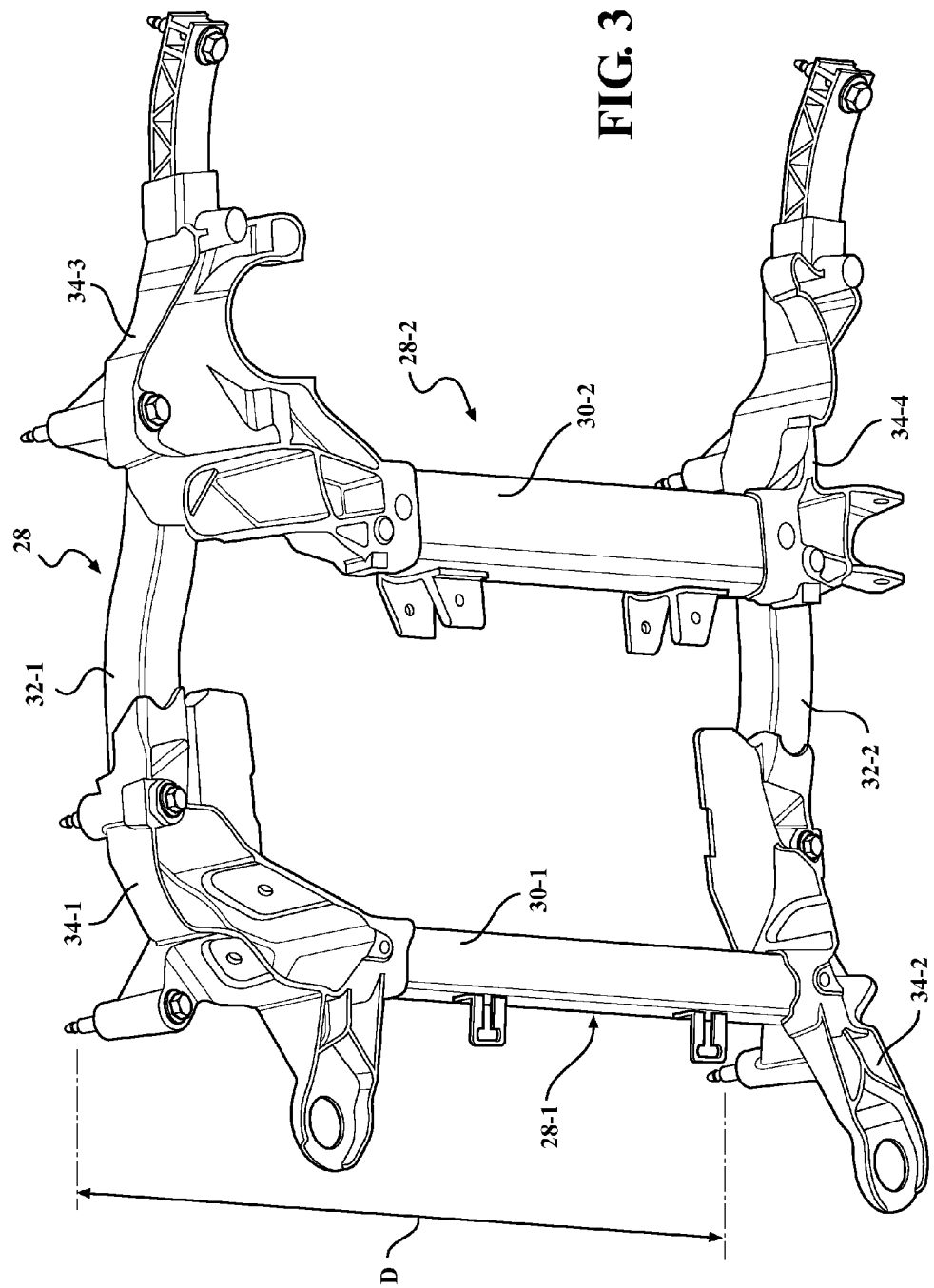
FIG. 3 is a perspective bottom view of the powertrain cradle shown in FIG. 2.

As shown in FIG. 3, the cradle 28 is a multi-component support sub-structure defined by a first end 28-1 and a second end 28-2. The cradle 28 includes a first cross-member 30-1 and a second cross-member 30-2, each arranged substantially transverse to the centerline C and spanning the distance D between the first and second frame rails 16A, 16B. The cradle also includes a first side section 32-1 and a second side section 32-2, and a first cast node section 34-1, a second cast node section 34-2, a third cast node section 34-3, and a fourth cast node section 34-4. The first cast node section 34-1 and the second cast node section 34-2 attach the first cross-member 30-1 to the first and second side sections 32-1, 32-2, respectively. The third cast node section 34-3 and the fourth cast node section 34-4 attach the second cross-member 30-2 to the first and second side sections 32-1, 32-2, respectively. The cradle 28 is mounted to the first frame rail 16A proximate the first end 28-1 and proximate the second end 28-2. Additionally, the cradle 28 is mounted to the second frame rail 16B proximate the first end 28-1 and proximate the second end 28-2. Mounted in such fashion, the cradle 28 forms a rigid structure for supporting the powertrain 20 with the frame 16.

As shown in FIG. 2, the vehicle structure 12 also includes a structure-stiffening panel 36. The panel 36 is attached to each of the first and second frame rails 16A, 16B and the cradle 28. The panel 36 is attached to the cradle 28 proximate the first end 28-1 and proximate the second end 28-2, and to each of the first and second frame rails 16A, 16B. The panel 36 includes a first portion 36-1 and a second portion 36-2. As shown, the first portion 36-1 and the second portion 36-2 are fused together via weld beads 36-3 to form a boxed cross-section 4-4 having enhanced strength and bending resistance, i.e. stiffness, as shown in FIG. 4. Each of the first and second portions 36-1, 36-2 may be formed from a suitable high strength material, such as aluminum, carbon fiber, multi-layer composite, or steel. Accordingly, although the weld beads 36-3 are shown, the specific mechanism for fusing the first and second portions 36-1, 36-2 depends on the selected materials. As shown in FIG. 5, the second portion 36-2 may include a stiffening rib or network of ribs 36-4 to further enhance stiffness of the panel 36. Furthermore, as also shown, to lighten the panel 36, the first and/or second portions 36-1, 36-2 may define apertures or voids 36-5 in areas experiencing minimal stress when the panel 36 is installed and subjected to loads in the vehicle 10. The panel 36 is attached to the cradle 28 proximate the first end 28-1 and proximate the second end 28-2, and to each of the first and second frame rails 16A, 16B. Although not specifically shown, the panel 36 may also be attached directly to each of the first and second frame rails 16A, 16B and a cradle that is constructed similar to cradle 28, but positioned proximate the rear portion 12-2 to support the differential 25.

As shown in FIG. 4, the cross-section 4-4 defines a plurality of apertures 38 extending there through. Each of the plurality of apertures 38 is configured to accept a fastener 40 for attachment of the panel 36 to one of the cradle 28 and the rails 16A and 16B. More specifically, as shown in FIG. 2, the panel 36 may be attached to each of the first and second cross-members 30-1, 30-2 and each of the first, second, third, and fourth cast node sections 34-1, 34-2, 34-3, and 34-4 of the cradle 28 via the fasteners 40. As shown, the plurality of apertures 38 is configured as a pattern that is arranged substantially symmetrically with respect to the centerline C such that the load is distributed substantially evenly between all the fasteners 40.

The panel 36 is configured, i.e., designed and positioned, to increase stiffness of the vehicle structure 12. Specifically, when positioned as shown in FIG. 2, the panel 36 increases the stiffness of the vehicle structure 12 near the powertrain 20 at the front of the vehicle 10, which generally also positions the vehicle steering system for turning vehicle's steered wheels. Vehicle wheels, especially the steered wheels, typically bear significant loads during cornering of the vehicle, and as such benefit from being attached to a rigid vehicle structure 12. Furthermore, high-performance vehicles that are designed to provide rapid transitions from acceleration to braking, generate elevated cornering speeds and lateral g-loads, and offer sharp response to steering input require a rigid vehicle structure 12, such that response of suspension components, such as springs and dampers, may be tuned, i.e., selected, more precisely. For such high-performance vehicle applications, the enhanced stiffness provided by the panel 36 enables more precise tuning of the vehicle suspension components.

As may be additionally seen from FIG. 2, the panel 36 may be characterized by a generally continuous surface 36-1 between the first end 28-1 and the second end 28-2. The depicted surface 36-1 is configured, i.e., designed and shaped, to be generally continuous such that aerodynamic disturbance under the vehicle body 14 is minimized. As would be understood by those skilled in the art, reduced aerodynamic disturbance around the vehicle 10 enhances vehicle performance such as vehicle top speed and acceleration. Additionally, reduced aerodynamic disturbance created by the vehicle 10 in turn reduces energy consumption of the powertrain 20 required to achieve and sustain desired vehicle speed. As a side benefit, the panel 36 may also serve to protect components of the drivetrain subassembly 18, such as an oil sump of the engine 22, which may otherwise be exposed to impacts from road debris.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle structure comprising:
    a frame having a first frame rail and a second frame rail, wherein the first and second frame rails are spaced apart by a distance and are substantially parallel to one another;
    a vehicle body attached to the frame;
    a cradle mounted under the vehicle body to each of the first and second frame rails and configured to support a vehicle drivetrain subassembly; and
    a panel attached to each of the first and second frame rails and the cradle, and configured to stiffen the vehicle structure;
    wherein the panel includes a first portion and a second portion fused together to form a boxed cross-section.

2. The vehicle structure of claim 1, wherein:
    the cradle is defined by a first end and a second end;
    the cradle is mounted to the first frame rail proximate the first end and proximate the second end, and to the second frame rail proximate the first end and proximate the second end; and
    the panel is attached to the cradle proximate the first end and proximate the second end, and to each of the first and second frame rails.

3. The vehicle structure of claim 2, wherein the panel is characterized by a generally continuous surface between the first end and the second end of the cradle such that aerodynamic disturbance under the vehicle body is minimized.

4. The vehicle structure of claim 1, wherein each of the first portion and the second portion is formed from aluminum, and the first and second portions are fused together via a weld bead.

5. The vehicle structure of claim 1, wherein the cross-section includes a plurality of apertures extending therethrough, and wherein each of the plurality of apertures is configured to accept a fastener for attachment of the panel to one of the cradle and the rails.

6. The vehicle structure of claim 5, wherein the cradle includes a first cross-member spanning the distance between the first and second frame rails and a second cross-member spanning the distance between the first and second frame rails, and the panel is attached to each of the first and second cross-members.

7. The vehicle structure of claim 6, wherein:
    the cradle includes a first side section and a second side section, and first, second, third, and fourth cast node sections;
    the first and second cast node sections attach the first cross-member to the first and second side sections, respectively, and the third and fourth cast node sections attach the second cross-member to the first and second side sections, respectively; and
    the panel is attached to each of the first, second, third, and fourth cast node sections.

8. The vehicle structure of claim 7, wherein:
    the vehicle body is characterized by a longitudinal centerline;
    the first and second frame rails and the cradle are each arranged substantially symmetrically with respect to the centerline; and
    the plurality of apertures is configured as a pattern that is arranged substantially symmetrically with respect to the centerline.

9. The vehicle structure of claim 1, wherein the vehicle drivetrain subassembly includes a powertrain having at least one of an internal combustion engine, a motor-generator, a fuel cell, and a transmission.

10. A vehicle comprising:
    a vehicle drivetrain subassembly; and
    a vehicle structure including:
        a frame having a first frame rail and a second frame rail, wherein the first and second frame rails are spaced apart by a distance and are substantially parallel to one another;
        a vehicle body attached to the frame;
        a cradle mounted under the vehicle body to each of the first and second frame rails and configured to support the drivetrain subassembly; and
        a panel attached to each of the first and second frame rails and the cradle, and configured to stiffen the vehicle structure
        wherein the panel includes a first portion and a second portion fused together to form a boxed cross-section.

11. The vehicle of claim 10, wherein:
    the cradle is defined by a first end and a second end;
    the cradle is mounted to the first frame rail proximate the first end and proximate the second end, and to the second frame rail proximate the first end and proximate the second end; and
    the panel is attached to the cradle proximate the first end and proximate the second end, and to each of the first and second frame rails.

12. The vehicle of claim 11, wherein the panel is characterized by a generally continuous surface between the first end and the second end of the cradle such that aerodynamic disturbance under the vehicle body is minimized.

13. The vehicle of claim 10, wherein each of the first portion and the second portion is formed from aluminum, and the first and second portions are fused together via a weld bead.

14. The vehicle of claim 10, wherein the cross-section includes a plurality of apertures extending therethrough, and wherein each of the plurality of apertures is configured to accept a fastener for attachment of the panel to one of the cradle and the rails.

15. The vehicle of claim 14, wherein the cradle includes a first cross-member spanning the distance between the first and second frame rails and a second cross-member spanning the distance between the first and second frame rails, and the panel is attached to each of the first and second cross-members.

16. The vehicle of claim 15, wherein:
the cradle includes a first side section and a second side section, and first, second, third, and fourth cast node sections;
the first and second cast node sections attach the first cross-member to the first and second side sections, respectively, and the third and fourth cast node sections attach the second cross-member to the first and second side sections, respectively; and
the panel is attached to each of the first, second, third, and fourth cast node sections.

17. The vehicle of claim 16, wherein:
the vehicle body is characterized by a longitudinal centerline;
the first and second frame rails and the cradle are each arranged substantially symmetrically with respect to the centerline; and
the plurality of apertures is configured as a pattern that is arranged substantially symmetrically with respect to the centerline.

18. The vehicle of claim 10, wherein the vehicle drivetrain subassembly includes a powertrain having at least one of an internal combustion engine, a motor-generator, a fuel cell, and a transmission.

\* \* \* \* \*